(No Model.)

J. KEITH.
BUTTON.

No. 302,411. Patented July 22, 1884.

Witnesses.
S. N. Piper
E. P. Pratt

Inventor.
Jeremiah Keith.
by R. H. Eddy att'y.

UNITED STATES PATENT OFFICE.

JEREMIAH KEITH, OF FLORENCE, MASSACHUSETTS.

BUTTON.

SPECIFICATION forming part of Letters Patent No. 302,411, dated July 22, 1884.

Application filed March 3, 1884. (No model.)

*To all whom it may concern:*

Be it known that I, JEREMIAH KEITH, of Florence, in the county of Hampshire, of the Commonwealth of Massachusetts, have invented a new and useful Improvement in Buttons; and I do hereby declare the same to be described in the following specification and represented in the accompanying drawings, of which—

Figure 1:
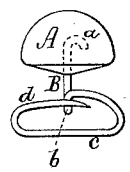
Figure 2:
Figure 3:
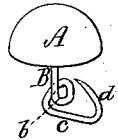
Figure 4:
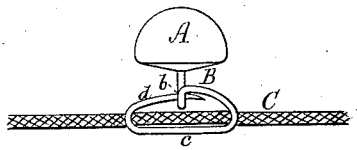
Figure 5:
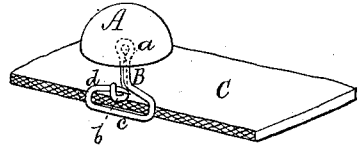

Figure 1 is a front elevation, Fig. 2 a side view, and Fig. 3 a perspective view, of a button containing my invention, the nature of which is defined in the claims hereinafter presented. Fig. 4 exhibits the button as applied to a piece of cloth, such piece being shown in section. Fig. 5 is a perspective view of the button with its fastening-shank constructed somewhat different from that shown in the other figures, but embodying the improvement therein.

The aforesaid drawings are made on an enlarged scale, in order to enable the construction of the button-shank to be clearly delineated.

In such drawings, A denotes the head, and B the fastening-shank, of the button, while in Figs. 4 and 5 C represents the cloth and shows the mode of applying thereto the said fastening-shank. This shank is a single piece of wire, usually pointed at its outer or lower end like a pin. At its upper end it may be hooked, or, like a pin, may be provided with a head, to hold it in the button-head.

In Fig. 1 the shank is represented as having at its upper end a hook, which is shown in dotted lines at $a$; but in Fig. 5 the part of the wire that is within the button is shown at $a$ as a loop, the shorter portion of the wire below the head being bent in the form of a hook, as shown at $b$.

In Figs. 1, 2, 3, and 4 the shank B near the head is represented as formed with a hook-shaped bend, from whence it is bent around in one and next in the opposite direction under the hook or bend $b$, in manner as shown at $c$ and $d$, the same being so as to enable the part $d$ to be sprung upward into the hook or bend $b$. In other words, that part of the shank that extends from the hook or bend $b$ and terminates in a point is bent in a looped form, so as to project under and in opposite directions from the said bend or hook, to admit of the shank near its pointed end to be sprung into the bend or hook, as shown in Figs. 4 and 5.

To secure the shank in a piece of cloth or other material, such shank is to be passed, pointed end foremost, twice through the cloth, in manner as shown in Figs. 4 and 5, after which the pointed part $d$ of the shank is to be sprung into the hook $b$.

In some cases, when the wire of which the shank is made is very small in diameter, the pointing of the shank may be dispensed with; but it is usually preferable to have the shank pointed, as such will save making with an awl holes in the material or cloth to receive the wire.

I claim—

1. In the improved button, the wire shank thereof provided with the fastening bend or hook $b$, and bowed or bent therefrom in the form of a loop, substantially as described, so as to enable it, (the said shank,) after having been inserted, in manner as represented, in cloth or other material, to have its free portion $d$ sprung upward into the bend or hook $b$, all essentially as shown and explained.

2. The wire shank pointed at one end, and at the other provided with the fastening bend or hook $b$, and bowed or bent therefrom in the form of a loop, so as to enable it (the said shank) to be readily inserted in cloth or other material, in manner as represented, and next to have its free or pointed portion $d$ sprung upward into the bend or hook $b$, all essentially as shown and explained.

JEREMIAH KEITH.

Witnesses:
R. H. EDDY,
E. B. PRATT.